United States Patent Office 3,560,199
Patented Feb. 2, 1971

3,560,199
PROCESS FOR CHLORINATION OF MATERIAL CONTAINING HARD METAL
Kurt Alfred Jönsson, Nynashamn, Sweden, assignor to Rederiaktiebolaget Nordstjernan, Nynashamn, Sweden
No Drawing. Filed Feb. 29, 1968, Ser. No. 709,230
Claims priority, application Sweden, Mar. 14, 1967, 3,500/67
Int. Cl. C22b 7/00
U.S. Cl. 75—112                                6 Claims

ABSTRACT OF THE DISCLOSURE

The invention relates to the chlorination of hard metal scrap i.e., cemented carbide. In order to gasify the carbon from the carbides of the hard metal carbon dioxide is added in the chlorination process.

---

This invention relates to a process for the chlorination of material containing hard metal mainly consisting of WC, TaC, NbC and/or TiC as hard materials and Co and/or Ni as binder metals. The present invention relates particularly to the recovering of the valuable metals contained in scraps of hard metal i.e., cemented carbide product.

If only chlorine is added one finds that the reaction ceases after a while owing to the circumstance that carbon is deposited on the hard metal pieces so that the chlorine and the hard metal are prevented from coming into contact.

The object of the process according to the present invention is to remove the carbon deposited on the hard metal pieces so that the chlorination reaction is not prevented or hampered.

The process according to the present invention is characterized in that $CO_2$ is added during the chlorination process in order to gasify the carbon contained in the hard metal.

At the temperature in question (about 1000° C.) the carbon is gasified according to the reaction $$CO_2 + C = 2CO$$

In this connection it is important to point out that pure carbon dioxide does not attack or oxidize the hard metal at the high temperatures used here. The carbon dioxide does not either react with chlorides already previously formed after their condensation.

It has proved suitable to add the carbon dioxide in a quantity of 0.05–1.0 kg., preferably 0.2–0.4 kg. per kg. hard metal.

It has previously been known that it is possible to remove the carbon by adding oxygen. This process involves, however, that oxychlorides, such as $WOCl_4$, $WO_2Cl_2$, $TaOCl_3$ and $NbOCl_3$, are formed in addition to the pure chlorides $WCl_5$, $WCl_6$, $TaCl_5$, $NbCl_5$ and $TiCl_4$.

Such an increase in the number of substances formed is a drawback for the subsequent settling. The settling may also be rendered more difficult owing to the circumstance that $WO_2Cl_2$ and $TaOCl_3$ are unstable and decompose in the following manner:

$$2WO_2Cl_2 = WOCl_4 + WO_3$$

and $$5TaOCl_3 = Ta_2O_5 + 3TaCl_5$$

$NbOCl_3$ is stable but it sublimates which is a drawback if one wishes to apply distillation as a settling method.

If one distills, it is also of value to have $WCl_6$ instead of $WOCl_4$ since it then is easier to settle the yielded chlorides. This becomes evident if one studies the boiling point of the chlorides in question:

|        | Boils at, ° C. |
|--------|----------------|
| $WOCl_4$ | 227 |
| $TaCl_5$ | 239 |
| $NbCl_5$ | 254 |
| and $WCl_6$ | 347 |

The temperature difference between $WOCl_4$ and $TaCl_5$ is 12° C. while the temperature difference between $NbCl_5$ and $WCl_6$ is 93° C.

If chlorine and carbon dioxide are mixed when added a certain amount of $WOCl_4$ is formed but not $WO_2Cl_2$, $TaOCl_3$ or $NbOCl_3$. This is an advantage as compared with the use of oxygen as a carbon gasifying agent.

If a low content of $WOCl_4$ is desired the supply of $Cl_2$ and $CO_2$ can tage place alternately.

If sufficiently short supply intervals are chosen the hard metal scrap serves as a thermal buffer, so that the heat which is developed in the course of the chlorination (exothermic reaction) is utilized for the subsequent carbon gasifying (endothermic reaction).

In order to prevent the carbon dioxide and chlorine from mixing one may add a small amount of an inert gas, for instance nitrogen at every alternate change so that one obtains the order chlorine, inert-gas, carbon dioxide inert-gas, chlorine and so on. In this case the inert-gas impels the chlorine gas and chlorides and carbon dioxide respectively which have remained in the bed from the previous treatment with chlorine and carbon dioxide respectively.

If desired the carbon dioxide formed can be diverted separately so that the gaseous chlorides are obtained undiluted.

The process according to the present invention is suitably carried out at an elevated temperature, i.e. at more than 700° C.

In order to illustrate the invention the following applicatory examples are given:

EXAMPLE 1

6.3 kg. hard metal scrap comprising WC, TaC, NbC and Co is entered into a reaction vessel of quartz. The vessel is heated to 1000° C. and chlorine, nitrogen and carbon dioxide are alternately supplied in the following manner.

Chlorine—25 g./min. for 10 minutes
Nitrogen—2 litres/min. for one minute
Carbon dioxide—5.7 litres/min. for 10 minutes
Nitrogen—2 litres/min. for one minute and so on.

The chlorination proceeded for 16 hours. When the chlorination was interrupted the quantity of free carbon amounted to 0.2 percent of the remaining quantity of hard metal scrap.

During an analysis subsequently carried out it appeared that the quantity of oxychloride was below 3 percent of the total quantity of chlorides obtained.

EXAMPLE 2

Hard metal scrap comprising WC and Co was chlorinated at 1000° C. in a reaction vessel of quartz. Chlorine and carbon dioxide were added in the following manner:

Chlorine+carbon dioxide (0.7 percent of the quantity normally required for the gasifying of all carbon precipitated for 10 minutes.

Carbon dioxide (in such a quantity that a total excess of 80 percent was yielded) for 10 minutes.

Chlorine+carbon dioxide (0.7 percent of the quantity theoretically required) for 10 minutes, etc.

23 kg. hard metal scrap was chlorinated during the test; after the test the remaining quantity of free carbon amounted to 25 g. constituting 2 percent of the quantity of carbon which had been bound in the hard metal scrap.

By this test 30 percent of the formed chlorides was obtained as $WOCl_4$ and the rest as $WCl_5$.

EXAMPLE 3

Hard metal scrap comprising WC, TaC, NbC, TiC and Co was chlorinated at 1000° C. in a reaction vessel of quartz. In this case chlorine was added not only to the bed but even to the hot product gases over the bed, so that primarily formed $WCl_5$ was converted into $WCl_6$. The chlorine supplied to the bed was mixed with carbon dioxide at the ratio of 2.4 mol $Cl_2$/mol $CO_2$. The quantity of free carbon in the bed after the test was insignificant.

23 percent of the obtained chloride mixture was composed of $WOCl_4$, 44 percent of $WCl_6$ and the remainder of $TaCl_5$, $NbCl_5$ and $TiCl_4$.

What I claim is:

1. In a method for recovering metals from a cemented carbide product containing at least one carbide selected from the group consisting of WC, TaC, NbC and TiC and at least one binder metal selected from the group consisting of Co and Ni in which said product is subjected at an elevated temperature to a chlorination process with chlorine gas, the improvement wherein $CO_2$ is employed in the process to gasify the carbon contained in the cemented carbide product.

2. A process according to claim 1, characterized in that the carbon dioxide is added in a quantity of 0.05–1.0 kg. per kg. hard metal of cemented carbide product.

3. A process according to claim 1, characterized in that the carbon dioxide is added in a quantity of 0.2–0.4 kg. per kg. hard metal of cement carbide product.

4. A process according to claim 1, characterized in that pure carbon dioxide and pure chlorine gas are added alternately.

5. A process according to claim 1, characterized in that an inert-gas is added between intervals with pure chlorine gas and pure carbon dioxide respectively.

6. A process according to claim 1, characterized in that chlorine and carbon dioxide have been mixed when added.

References Cited

UNITED STATES PATENTS

| | | | |
|---|---|---|---|
| 2,485,175 | 10/1949 | Trapp | 23—87 |
| 2,704,240 | 3/1945 | Avery | 75—84X |

I. DEWAYNE RUTLEDGE, Primary Examiner

E. L. WEISE, Assistant Examiner

U.S. Cl. X.R.

75—84

UNITED STATES PATENT OFFICE
CERTIFICATE OF CORRECTION

Patent No. 3,560,199　　　　Dated February 2, 1971

Inventor(s) Kurt Alfred Jönsson

It is certified that error appears in the above-identified patent and that said Letters Patent are hereby corrected as shown below:

Column 4, lines 5 and 8, cancel "hard metal", each occurrence.

Signed and sealed this 13th day of July 1971.

(SEAL)
Attest:

EDWARD M. FLETCHER, JR.　　　　　　　　WILLIAM E. SCHUYLER, JR.
Attesting Officer　　　　　　　　　　　Commissioner of Patents